United States Patent [19]

Grossmann

[11] 4,113,536
[45] Sep. 12, 1978

[54] METHOD AND APPARATUS FOR AUTOMATICALLY MAKING FRAMES

[76] Inventor: Peter Grossmann, An der Mühle 27, 6570 Kirn, Germany

[21] Appl. No.: 677,541

[22] Filed: Apr. 16, 1976

[30] Foreign Application Priority Data

Apr. 22, 1975 [DE] Fed. Rep. of Germany ....... 2517672

[51] Int. Cl.$^2$ .................... B29C 17/02; B29C 24/00; B29C 27/00
[52] U.S. Cl. .................... 156/218; 156/304; 264/248; 264/295; 264/296; 264/322; 264/339
[58] Field of Search ............. 264/248, 285, 322, 339, 264/320, 296, 299, 323, 327; 425/383, 392; 228/146, 149, 173, 151, 152; 29/156.61, DIG.3; 72/127, 133, 168, 176, 321, 324, 128; 156/196, 304, 481, 217, 218, 306, 443

[56] References Cited

U.S. PATENT DOCUMENTS

| 358,552 | 3/1887 | Higgins | 228/146 |
| 649,857 | 5/1900 | Murphy | 228/146 |
| 950,280 | 2/1910 | Everson | 29/DIG. 3 |
| 2,115,441 | 4/1938 | Black | 29/11 |
| 2,687,564 | 8/1954 | Whitney | 228/151 |
| 3,605,472 | 9/1971 | Saito et al. | 72/176 |
| 3,834,010 | 9/1974 | Wolfe | 228/146 |

FOREIGN PATENT DOCUMENTS

7,033,087 4/1972 France ........................ 264/295

OTHER PUBLICATIONS

Randolph et al., Plastics Engineering Handbook, Reinhold, N.Y. (1960) pp. 504–507.

*Primary Examiner*—Willard E. Hoag
*Attorney, Agent, or Firm*—Barnes, Kisselle, Raisch & Choate

[57] ABSTRACT

A method of automatically making frames from elongate workpieces, more particularly plastics, characterized in that the workpieces are heated individually at predetermined places to be subsequently bent and at the ends. Each workpiece is conveyed transversely of its longituidinal extension along a path which is formed by longitudinal guides with predetermined edge curvatures and along which spatially curved guide-like stops are provided, so that the particular workpiece is forced to bend itself around the edge curvature. This operation is repeated at least in accordance with half the number of the places of the workpiece to be bent, whereafter the two ends of the workpiece have approached one another and the ends of the workpiece are melted and pressed against one another.

3 Claims, 7 Drawing Figures

METHOD AND APPARATUS FOR AUTOMATICALLY MAKING FRAMES

The invention relates to a method and apparatus for automatically making frames from elongate workpieces which can be deformed under heat and connected to one another, more particularly the invention relates to weldable materials such as plastics, such as for example, polyvinyl chloride.

It is known to make reinforcing frames for trunks or valises from plastics by starting from elongate strip or rod shaped workpieces, heating the workpieces at predetermined places and bending them, whereafter the ends are welded to one another. Hitherto the performance of these operations has required a number of independent machines, namely a heating machine for heating units, a bending machine with an associated bending table and four links, and a welding machine for heating and welding the ends of the prebent frame. Such machines have been combined into one installation which, however, has numerous disadvantages. For instance, automatic feed is impossible, a great deal of time is required for conveying between the individual machines, which take up a large amount of space, the operation of the bending table means that the bendings of the frame to be produced must be performed successively, and the prebent frame must be allowed to cool before it can be removed from the bending machine and finished on the welding machine. Accuracy of manufacture is moreover not very high with the prior art installation, so that for instance frames to be used for the top and bottom parts of trunks must first of all be investigated as to whether they actually fit into one another. A further disadvantage of the prior art installation is that the frames must have relatively large bending radiuses.

The above disadvantages are overcome according to the present invention by a method of automatically making frames from elongate workpieces, more particularly plastics, wherein the workpieces are heated individually at predetermined places to be subsequently bent and at the ends; each workpiece is conveyed transversely of its longitudinal extension along a path which is formed by longitudinal guides with predetermined edge curvatures and along which spatially curved guide-like stops are provided, so that the particular workpiece is forced to bend itself around the edge curvature; this operation is repeated at least in accordance with half the number of the places of the workpiece to be bent, whereafter the two ends of the workpiece have approached one another and the ends of the workpiece are melted and pressed against one another.

According to a further feature of the invention there is provided an apparatus for automatically making frames from elongate workpieces, more particularly of plastics, wherein a feed device is provided for feeding individual workpieces from a stack to a working table having heating units; a conveyor operating transversely of the longitudinal extension of the working table is provided to shift individual workpieces into a group of bending tools; each bending tool of the group comprises a longitudinal guide with predetermined edge curvature and an associated spatially curved guide-like stop; the longitudinal guides of the bending tools are disposed parallel with one another and in accordance with the insides of the corners of the frame to be produced; and in the conveying direction downstream of the group of bendingtools a welding device is provided to connect the ends of the workpiece to be produced.

The invention is now described in greater detail by way of example with reference to the figures of the accompanying drawings.

Figure 1:
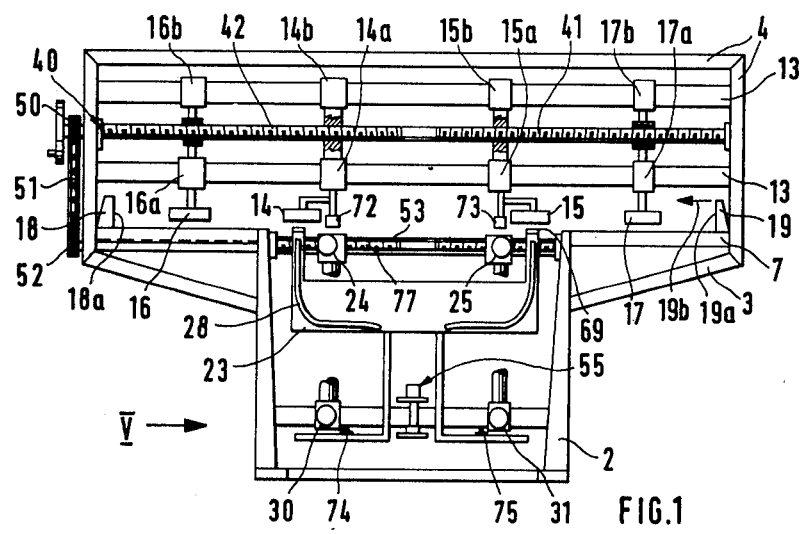
FIG. 1 is a front elevation of the machine according to the invention; bending tools
Figure 2:
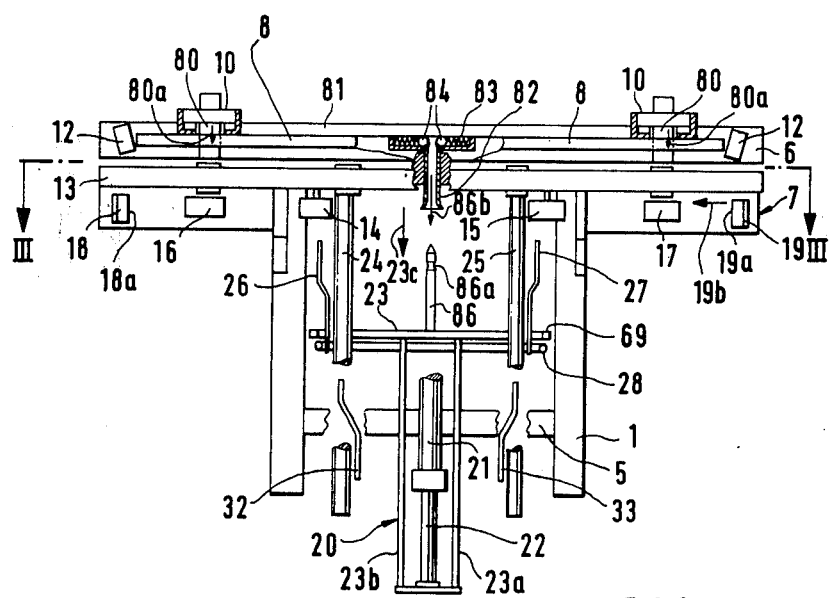
FIG. 2 is a plan view of the machine of FIG. 1.
Figure 3:
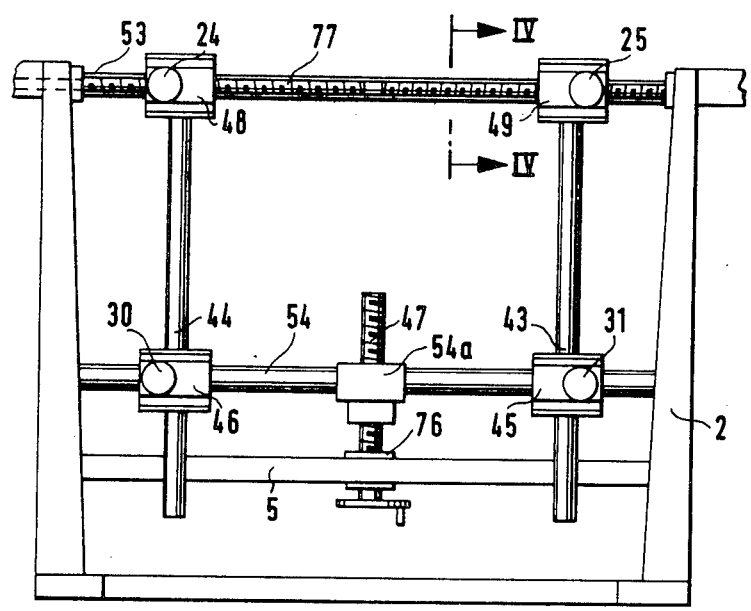
FIG. 3 is a cross-sectional view taken along the line III—III in FIG. 2.

Referring now to the figures of the drawings, the machine or apparatus of the invention has a machine frame shown more particularly in FIGS. 1 and 2 and base parts 1, feet 2, reinforcements 3, frame parts 4 and a transverse bar 5. A stand-by table 6 and working table 7 are provided. The working surface of the table 7 can be formed by individual supports. The table 6 has two pushers 80 interconnected via a rod 81 having an intercepting attachment 82 comprising a tube widening after the fashion of a funnel and two ball notch devices each comprising a spring 83 and a ball 84 which extend into the inner space of the tube of the interception attachment 82. The rod 81 can be displaced parallel with itself, for which purpose a guide is provided for the tube of the intercepting attachment 82. For the same purpose further guide attachments can be disposed on the rod 81 and run in corresponding guides (not shown). The intercepting attachment 82 cooperates with a connecting rod 86 formed with groove 86a in which the balls 84 engage when the connecting rod 86 is pushed into the intercepting attachment 82. When the connecting rod 86 is then moved in the direction indicated by the arrow 86b, the intercepting attachment 82 and therefore the rod 81 is entrained, until the pushers 80 each impinge against the stop (not shown), whereafter the connecting rod 86 is released from the intercepting attachment 82. The stops for the pushers 80 can be so adjusted that the pushers 80 can deposit a workpiece 8 precisely on the working table 7.

The workpieces 8 consist of rod or strip shaped sheets or hollow sections of plastics, more particularly polyvinyl chloride and are laid in a stack on the table 6. Disposed in the zone of the pushers 80 are adjustable magazine holders 10 which cooperate with guide stops 12 to retain the inserted stack of workpieces 8. Each of the pushers 80 disappears under the magazine holder 10 and, as it moves in the direction indicated by arrows 80a, entrains in each case the lowest workpiece 8 of the stack (isolating it). Extending above the surface of the tables 6, 7 are guide elements 13 parallel with the tables; round or profiled guide elements 13 can be used. Disposed on the guide elements 13 are guide pillow block 14a, 14b, 15a, 15b, 16a, 16b, 17a, 17b which bear heating radiators as heating units 14–17. If a square frame is to be produced, in relation to a workpiece 8 two inner units 14, 15 can be distinguished from the two outer units 16, 17. In general the number of bending places provided on the workpiece 8 corresponds to the number of heating units.

Disposed at the two ends of the work table 7 are a fixed winding, a heating unit 18 with a welding platen 18a and a movable heating and welding unit 19 with an adjustable welding platen 19a. The distance apart of the welding platens 18a, 19a in the working clearance is at first larger than the length of the workpiece 8, but the distance is reduced to the required length of the workpiece as soon as the workpiece is lying on the working table 7. Then the movable heat unit 19 is moved in the direction shown by arrow 19b and the workpiece is clamped between the welding platens 18a, 19a. During this contact the ends of the workpiece are heated and if necessary any slight deviations from the required length can be compensated by melting material away. The workpiece 8 leaving the working table 7 therefore always has the identical re-adjusted length.

When the machine is changed over to a different workpiece length, the distance of the members 11, 12 and 18, 19 from one another is re-adjusted; the adjustment facilities are coupled to one another for the more convenient performance of such adjusting work.

The heating units 14, 15, 16 and 17 are medium-wave infra-red radiators which can manage without contacting the bending places for the workpiece, while at the same time making sufficient heating power available.

Figure 7:
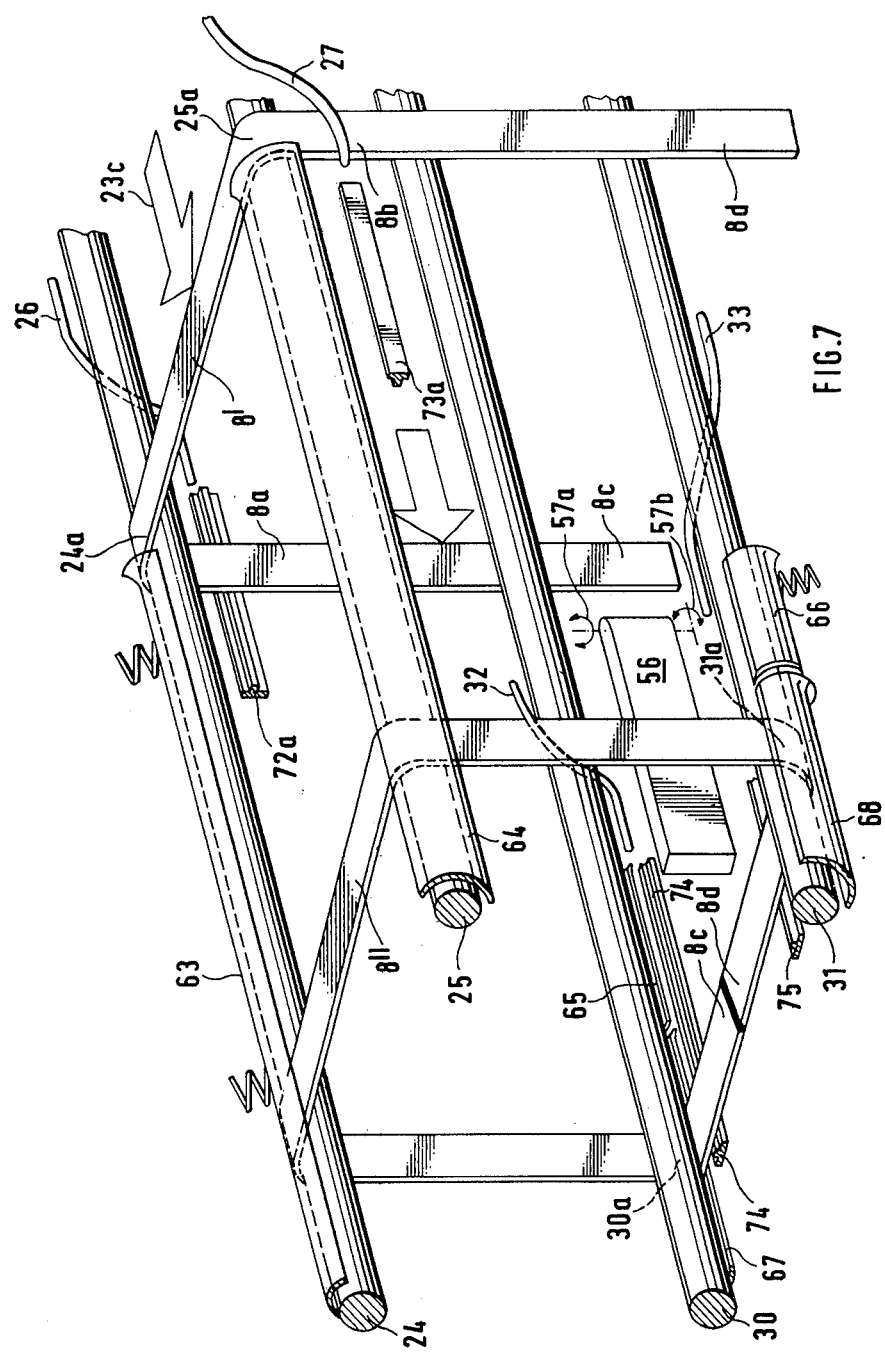
FIG. 7 is an oblique persepctive view of essential parts of the machine.

After the places of the workpiece 8 to be bent have been heated, the workpiece is moved transversely of the longitudinal extension of the table 7 into a bending device by a conveyor 20 containing an actuator 21, 22 connected via thrust rods 23a, 23b to a gripper frame to which the connecting rod 86 is attached. The cylinder 21 of the actuator is disposed transversely of the longitudinal extension of the table 6, 7 and horizontally and is pneumatically actuated. The starting position of the piston 22 corresponds to the connecting position of the parts 82-86, and during the outward stroke simultaneously the workpiece is moved from the stack onto the working table 7 and another heated workpiece 8, lying on the table, is seized by the gripper frame 23. The gripper frame 23 is adapted to the size of the frame to be produced and when the piston 22 is extended forces the heated workpiece 8 in the direction indicated by the arrow 23c into the bending device. Each bending tool comprises mainly a longitudinal guide 24, 25, 30, 31 with predetermined edge curvature and an associated specially curved stop 26, 27, 32, 33. For a square frame four bending tools 24, 26, 25, 27, 30, 32 and 31, 33 are provided. The longitudinal guides 24, 25, 30, 31 consist of tubes or rods of predetermined small radius of curvature on the side opposite the stops 26, 27, 32, 33. A distinction can be drawn between two top bending tools 24, 26; 25, 27 and two bottom bending tools 30/32; 31/33. As shown in FIG. 7, the places 8a, 8b of the workpiece 8 abut the guide-rail-like stops 26, 27, so that the free ends of the workpiece are forced downwards around the bending place 24a, 25a. The workpiece ends are displaced in relation to the gripper frame 23, and to reduce friction a bent bearing 28 is provided on the gripper frame 23. To prevent the workpiece 8 from marching upwards, extra adjustable hold-down means 72, 73 (FIG. 1) are provided. The hold-down means 72, 73 are disposed at a predetermined distance from the associated longitudinal guides and force the workpiece against the corresponding longitudinal guide when the workpiece is conveyed by the gripper frame 23 through the bending device. For the same purpose further lateral hold-down means 72a, 73a (FIG. 7) can be provided which are adjusted in accordance with the characteristics of the particular workpiece. Guide plates 63 - 68 bent through a quarter of a circle are provided from which the members 63 to 66 are resiliently suspended.

As the workpiece 8 continues to move through the bending device the bottom bending tools 30, 32 and 31, 33 come into operation, and the outer bending places 30a, 31a are produced. In this case also extra hold-down means 74, 75 can be provided which, as the gripper frame 23 passes, force the workpiece 8 to lay themselves precisely around the edge curvature of the bottom longitudinal guide 30, 31.

A description will now be given of how the aforedescribed machine can be changed over to a different length of workpiece 8. For adjustment to the altered dimensions of the workpiece 8 the inner heating units 14, 15 can be moved towards one another or away from one another; to this end the sliding pillow block 14a, 14b; 15a, 15b each have an adjusting nut disposed on an adjusting spindle 40 with right hand and left hand screwthreading 41, 42. By rotating the spindle 40, therefore, the heating units 14, 15 can be slid towards one another or away from one another on the guide elements 13.

Figure 4:
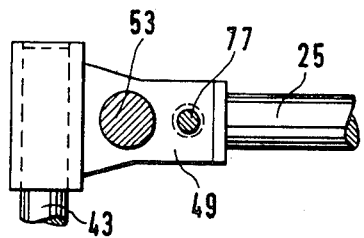
FIG. 4 shows a detail in sectional view taken along the line IV—IV in FIG. 3.

Since for the making of rectangular frames the heating units 14, 15 must always be disposed at the same place as the superimposed longitudinal guides 24, 30, 25, 31, provision is made for displacing these members and the associated guide-like stops 26, 27, 32, 33 and the hold-down means 72, 73, 74, 75 simultaneously in the horizontal direction. Attached to each longitudinal guide 24, 25, therefore, is a pillow block with screwthreaded nut 48, 49 which run on a rod 53 or a screwthreaded spindle 77 (FIG. 4), also having a right hand and left hand screwthreading to agree with the screwthreaded spindle 40, moving towards one another or away from one another on the rotation of the screwthreaded spindle 77 and thus adjusting the longitudinal guides 24, 25. The screwthreaded spindles 40 and 77 are coupled to one another via sprocket wheels 50, 52 and a chain 51. The pillow blocks 48, 49 are also connected by coupling rods 43, 44 to cross pillow blocks 45, 46 which can slide on the one hand on the coupling rods 43, 44 and on the other a connecting rod 54 and bear the longitudinal guides 30, 31. In this way with the adjustment of pillow blocks 48, 49 and the associated longitudinal guides 24, 25 the bottom longitudinal guides 30, 31 are simultaneously entrained and adjusted. The connecting rod 54 also has a pillow block with a screwthreaded nut 54a cooperating with a screwthreaded spindle 47, so that the position in height of the connecting rod 54 and therefore of the cross pillow blocks 45, 46 also can be adjusted, the cross pillow blocks sliding on the coupling rods 43, 44. In this way the correct vertical adjustment of the longitudinal guides 30, 31 can be adjusted. The end of the screwthreaded spindle 47 bears via a bearing 76 against a cross strut 5 of the machine frame.

For adjustment to the different bending places of the workpiece, therefore, the following adjustments are made: To adjust the inner bending places 24a, 25a the inner heating 14, 15 must be shifted horizontally together with the bending tools 24/26, 25/27, 30/32 and 31/33 and the hold-down means 72, 73, 74 and 75. As shown in FIG. 1, the heater units 14, 15 are directly connected to the hold-down means 72, 73 and are adjusted by rotation of the adjusting spindle 40. By coupling via the chain transmissions 50, 51, 52 the screwthreaded spindle 77 is driven, entraining by its right hand and left hand screwthreading the screwthreaded nuts of the pillow blocks 48, 49 and therefore also the longitudinal guides 24, 25 and also 30, 31. As a result part of the adjusting movement of the outer bending places 30a, 31a has already been performed, while the remaining part is performed by rotating the adjusting spindle 47, by which the connecting rod 54, the cross pillow blocks 45, 46 and the longitudinal guides 30, 31 are adjusted. Disposed on the connecting rod 54 are Bowden cables (not shown) which are connected to the outer heating units 16, 17 for their adjustment. The heating units 16, 17 can be adjusted manually, eliminating the Bowden cables. The spindles can also be driven by a motor.

Figure 5:
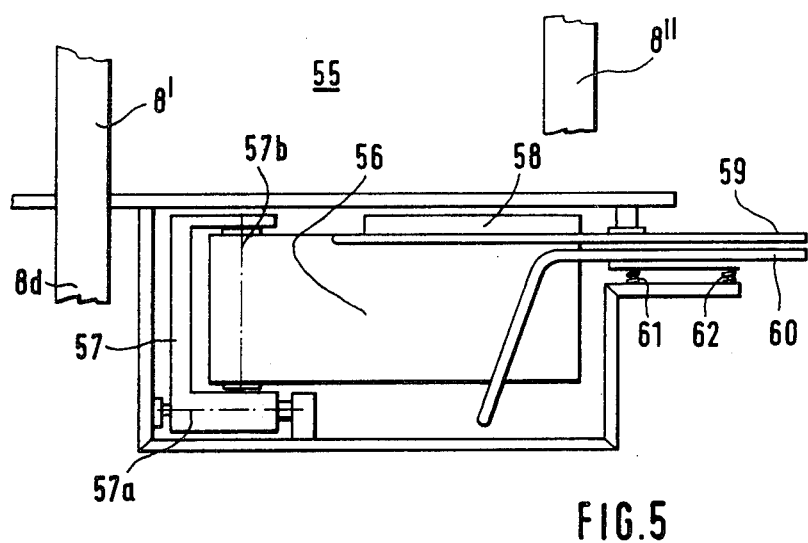
FIG. 5 is a view taken in the direction of the arrow V in FIG. 1.
Figure 6:
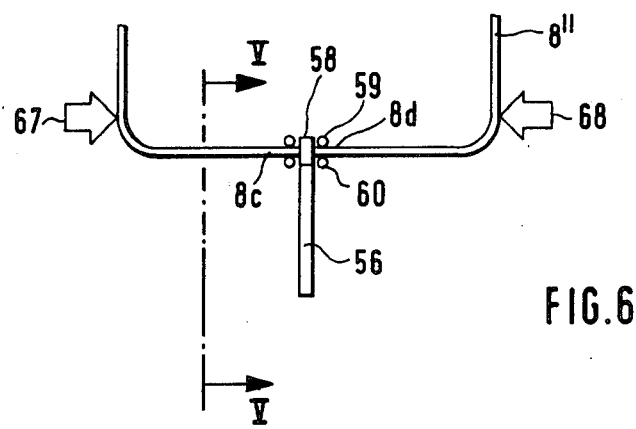
FIG. 6 is a detail of the machine of FIG. 1.

While the workpiece 8 is bent in the four bending tools to produce a frame which is still open (FIG. 7), the workpiece ends 8c, 8d are pushed by the gripper frame 23 continuing to advance into a welding device 55 (FIGS. 1, 5, 6 and 7), Disposed upstream of the welding device 55 is a guide plate mounted in universal joint 57 and heated by heating element 58. Guide rails 59, 60 (FIG. 5) guide the ends 8c, 8d of the still open frame in the horizontal direction along the heating element 58 which heats and melts the two ends 8c, 8d. Beyond the heating element 58 the ends 8c, 8d are pressed on to one another and against one another, for instance, guide plates 67, 68 bent through a quarter of a circle, thus ensuring a reliable welding of the two rod ends. The guide rails 59, 60 are to some degree compressed by springs 61, 62, so that the ends to be welded are satisfactorily aligned and finally the movement of the frame is decelerated.

After the frame has been ejected from the welding device 55 and the gripper frame 23 has moved back, the frame produced remains for a long enough time in the machine to cool. During this time the gripper frame 23, pushed by the piston 22, returns to its starting position in which the connecting rod 86 is connected to the intercepting attachment 82. To pass through beneath workpiece 8, the gripper frame 23 has at its top end latches 69 which are withdrawn during the movement of the gripper frame into its starting position and then again erected. During the advance of the piston 22 a fresh workpiece 8 is moved into the table and then heated workpiece 8 on the table is pushed on into the bending device. Then operations proceed as described hereinbefore.

To illustrate the principle of the invention clearly, FIG. 7 shows the workpiece 8 in two positions 8' and 8", the reference 8' showing the shape of the workpiece immediately after the passage of the top bending tools and the reference 8" showing the shape of the frame after bending in the bottom bending tools.

The advance achieved by the method and corresponding apparatus according to the invention mainly resides in the fact that a robust lightweight machine of simple construction can produce rapid and reliable shaping and connection using stationary, readily interchangeable and rapidly alterable tools, merely by the rectilinear movement of a gripper frame. The method is fully automated and obviates the disadvantage of the previous installation using several machines, the invention calling for minimum expense in the control of the single working piston which conveys the workpiece through the machine. It was surprising and certainly not suggested by the known installation to achieve the spatial multiple bending of a frame by a rectilinear operational movement and stationary tools. The products from the constructed machine prove the progress achieved by the apparatus according to the invention in comparison with the known products.

I claim:

1. The method for making plastic frames having a plurality of straight portions connected by bent portions which comprises heating elongated plastic workpieces of a heat sealable heat softenable plastic at longitudinally spaced areas corresponding to the portions to be bent, successively moving each workpiece after it is heated continuously in a direction transverse to the direction of its length past a plurality of sets of stationary bending tools to bend said workpiece successively at said heated areas and to bring the free ends of said workpiece into abutment, heating the free ends of said workpiece, and forcing the ends against one another to join the ends.

2. the method set forth in claim 1 including the step of heating the ends of each workpiece prior to moving said workpiece transversely.

3. The method set forth in claim 1 including the step of permitting a frame to be cooled and heating the successive workpiece at said longitudinally spaced areas while said frame is being cooled.

* * * * *